US005123217A

United States Patent [19]

Ishikawa et al.

[11] Patent Number: 5,123,217

[45] Date of Patent: Jun. 23, 1992

[54] DRILL FOR USE IN DRILLING HARD AND BRITTLE MATERIALS

[75] Inventors: Tadao Ishikawa, Toyama; Yutaka Yoshida, Himi; Toshiyuki Sunakoda, Toyama, all of Japan

[73] Assignee: Kabushiki Kaisha Fujikoshi, Toyama, Japan

[21] Appl. No.: 574,358

[22] Filed: Aug. 29, 1990

[30] Foreign Application Priority Data

Aug. 31, 1989 [JP] Japan ................................ 1-222990

[51] Int. Cl.[5] ........................ B23B 27/14; B23B 27/20

[52] U.S. Cl. .............................. 51/206 R; 51/209 R; 76/108.1; 175/425; 408/144; 408/145

[58] Field of Search ............ 408/144, 145; 51/206 R, 51/206 P, 206 NF, 206.4, 206.5, 209 R, 207, 209 DL, 209 S, 210; 175/329, 330, 409–411; 76/108.1, 108.2, 108.4, 108.6

[56] References Cited

U.S. PATENT DOCUMENTS

| | | | |
|---|---|---|---|
| 1,907,14 | 5/1933 | Mitchell | 175/330 |
| 1,887,372 | 11/1932 | Emmons | 408/144 |
| 2,371,488 | 3/1945 | Williams, Jr. | 175/330 |
| 2,910,810 | 11/1959 | Fuchs | 51/206 R |
| 3,017,790 | 1/1962 | Werle | 408/144 |
| 3,183,632 | 5/1965 | Ferchland | 51/206 R |
| 3,299,579 | 1/1967 | Jacobson | 51/206 R |
| 4,274,769 | 6/1981 | Multakh | 408/145 |
| 4,483,108 | 11/1984 | Howard | 408/145 X |
| 4,527,643 | 7/1985 | Horton | 408/144 |
| 4,720,218 | 1/1988 | DeFries et al. | 51/206 R |
| 4,854,788 | 8/1989 | Okinaga | 408/144 X |
| 4,947,588 | 8/1990 | Steger | 51/206 R |
| 4,989,375 | 2/1991 | Henmi | 51/209 R |

FOREIGN PATENT DOCUMENTS

| | | |
|---|---|---|
| 55-23768 | 6/1980 | Japan . |
| 56-41954 | 10/1981 | Japan . |

OTHER PUBLICATIONS

Tool and Manufacturing Engineer's Handbook, Fourth Ed., vol. 1, "Machining", Society of Manufacturing Engrs., 11-18 to 11-20, 1983.

American National Standard Engineering Drawings and Related Documentation Practices, "Dimensioning and Tolerancing", ASME, pp. 4–5, 9, 132, 1983.

*Primary Examiner*—Bruce M. Kisliuk
*Assistant Examiner*—John A. Marlott
*Attorney, Agent, or Firm*—Spencer, Frank & Schneider

[57] ABSTRACT

A drill for use in drilling hard and brittle materials includes a shank and a drilling portion attached to one end of the shank. The drilling portion includes a tapered primary cutting edge, a first secondary cutting surface extending from the primary cutting edge and having an angle of taper substantially identical to that of the primary cutting edge, and a second secondary cutting surface extending from the first secondary cutting surface and containing a line substantially parallel to the central axis of the drill. The primary cutting edge has a first abrasive grain layer, and the first and second secondary cutting surfaces both have a second abrasive grain layer. The first and second abrasive grain layers both have a binder made of material selected from the group consisting of metal, resin and glass. Each abrasive grain in the first abrasive grain layer has a diameter greater than that of each abrasive grain in the second abrasive grain layer.

3 Claims, 3 Drawing Sheets

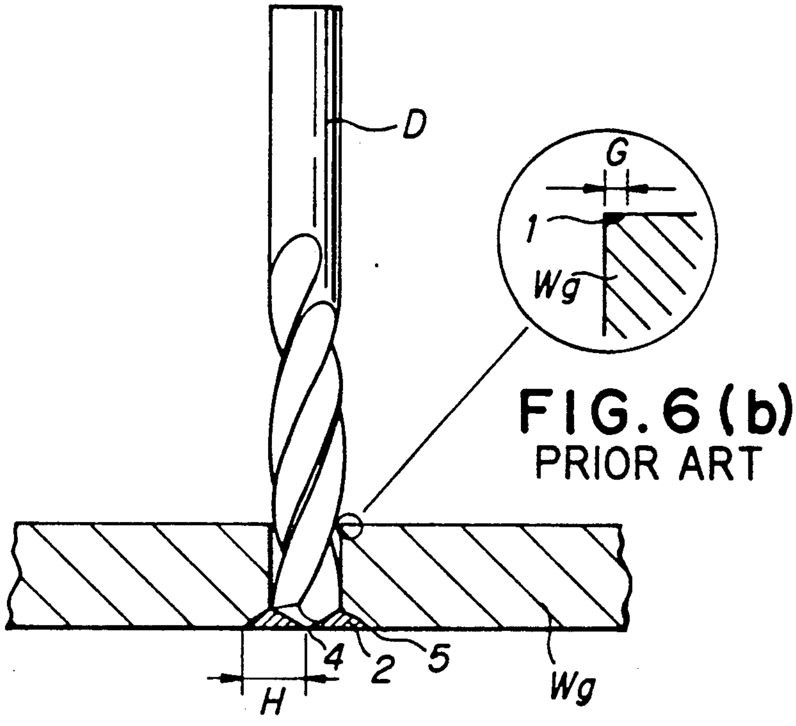
FIG. 6(b)
PRIOR ART
FIG. 6(a)
PRIOR ART
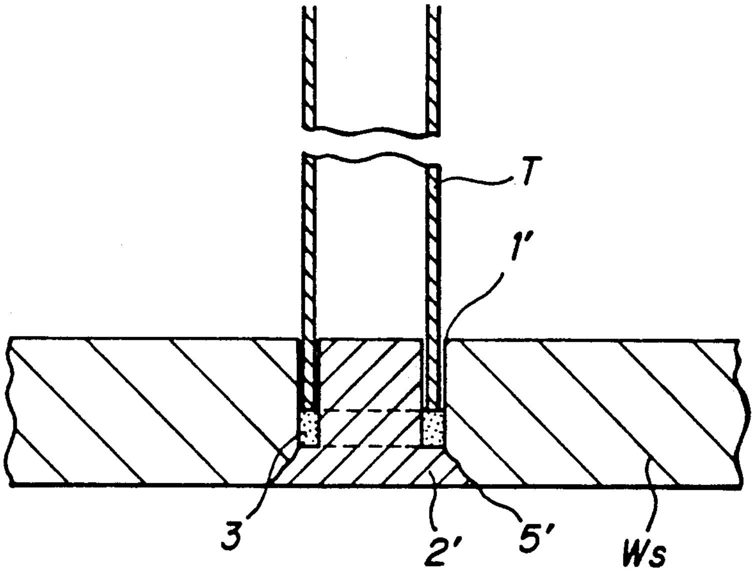
FIG. 7
PRIOR ART

DRILL FOR USE IN DRILLING HARD AND BRITTLE MATERIALS

TECHANICAL FIELD

The present invention relates to an improvement in a tool or drill suitable for use in drilling a workpiece made, particularly, of ceramics, glass or other hard and brittle materials.

BACKGROUND INFORMATION

A conventional drill is disclosed, for example, in Japanese utility model publication No. 56-41954. The prior art drill includes a cutting edge at its tip, a tapered portion extending from the cutting edge, and a rectilinear portion extending from the tapered portion. Abrasive grains are applied to the outer surface of each of the portions. The drill is fabricated to provide a plurality of axially extending spiral grooves. Also, a plurality of grooves are formed in the outer periphery of the rectilinear portion and extend between the spiral grooves. This drill also serves as a honing tool. Japanese utility model publication No. 55-23768 also discloses a drill in which grains made of a material harder than at least the drill body, such as diamond and cubic boron nitride, are deposited to its tip where removed materials are likely to clog. Another tool, shown in FIG. 7 and commonly referred to as a core drill, includes a hollow cylindrical shank. The shank has a cylindrical front end to which highly abrasive grains are applied. The abrasive grains are bonded by metal.

No attempts have been made to eliminate the occurrence of chippage or chattering, particularly, at the entrance of each hole. When the existing drills are used to drill holes in a material made of glass or ceramics, then the material must be chamferred to remove chippage. With specific reference to FIG. 6, a twist drill (D) has super abrasive grains thereon. When a sheet of glass (Wg) is drilled by the twist drill (D), chippage 1 and chattering 2 are likely to occur at the entrance and exit of each hole, respectively.

As shown in FIG. 7 a conventional core drill (T) is hollow and cylindrical in shape. Super abrasive grains are applied to the front end of the core drill to provide a cutter (3). When this core drill (T) is used to drill a ceramic plate (Ws), chippage 1 and chattering 2 are also likely to occur at the entrance and exit of each hole, respectively. The core drill tends to create more serious chippage than the twist drill (D) with a chisel edge 4 at its tip shown in FIG. 6. In addition, the chattering 2 results from cracks 5 extending outwardly from the front end of the core drill (T).

In order to overcome the foregoing problems, a plurality of tools were used to first drill one side of a workpiece and then the other side in an aligned fashion. Another attempt was made to attach a dummy material to the rear surface of a workpiece by means of an adhesive and remove the dummy material from the workpiece after drilling is completed. However, these attempts all result in a substantial decrease in the productivity and are not economical.

DISCLOSURE OF THE INVENTION

In accordance with the present invention, there is provided a drill for use in drilling hard and brittle materials, which comprises a shank adapted for attachment to a shaft of a machine, and a drilling portion attached to one end of the shank and having a tapered primary cutting edge located adjacent to a center of rotation of the drill, a first secondary cutting surface extending from the primary cutting edge and having an angle of taper substantially identical to that of the primary cutting edge, and a second secondary cutting surface extending from the first secondary cutting surface and containing a line substantially parallel to a central axis of the drill, the primary cutting edge having a first abrasive grain layer, and the first and second secondary cutting surfaces both having a second abrasive grain layer, the first and second abrasive grain layers both having a binder made or material selected from the group consisting of metal, resin and glass, and each abrasive grain in the first abrasive grain layer located on the primary cutting edge having a diameter greater than that of each abrasive grain in the second abrasive grain layer located on each of the first and second secondary cutting surfaces.

In order to overcome the foregoing problems, the drill of the present invention uses super abrasive grains, such as diamond and CBN, in drilling hard and brittle materials. The super abrasive grains are bonded by glass, metal or resin. The primary cutting edge is subject to the maximum load during drilling operation. The first and second secondary cutting surfaces are subject to low load and designed to prevent chippage and chattering at the entrance and exit of each hole, respectively. A variety of diameters of super abrasive grains cause the primary cutting edge and the secondary cutting surfaces to function in a different manner. All or part of each primary cutting edge has an angle of taper substantially identical to that of each first secondary cutting surface. This design eliminates the occurrence of chippage and chattering at the entrance and exit of each hole, respectively and thus provides high hole quality.

More specifically, the diameter of each abrasive grain present in the primary cutting edge is different from that of each abrasive grain present in the first and second secondary cutting surfaces. This causes the primary cutting edge and the first and second secondary cutting surfaces to function in a different manner. It has been found that a larger diameter abrasive grain enhances the efficiency of drilling. This is because such a larger diameter abrasive grain projects more from the drill surface than that of a smaller diameter abrasive grain and provides a greater amount of removed material during drilling operation. The size of chippage at the entrance of each hole depends on the characteristics of a workpiece to be drilled and the diameter of the abrasive grain. It has also been found that the smaller the diameter of the abrasive grain acting on the wall of each hole, the smaller the chippage. It could be due to notch effect caused by the abrasive grain. The shape of the drill, rather than the diameter of the abrasive grain, has substantial effect on the occurrence of chattering at the exit of a hole. The drill of the present invention is so designed as to enhance the efficiency of drilling as well as to reduce the chippage and chattering with a single stroke of drilling. To this end, the primary cutting edge, subject to the maximum load, includes high quality abrasive grains of a large diameter which have little tendency to fracture, whereas the first secondary cutting surface includes abrasive grains of a relatively small diameter to prevent chippage at the entrance of each hole. Also, the primary cutting edge and the first secondary cutting surfaces are continuously tapered substantially in the same fashion. If chattering results from the operation of the primary cutting edge, then such chattering can be finished by the tapered surface of each first secondary cutting portion. Accordingly, the drill of the present invention is highly efficient, is capable of reducing chippage and chattering, and this provides high quality holes.

BRIEF DESCRIPTION OF THE DRAWINGS

A better understanding of the present invention may be had by reference to the following description of preferred embodiments when taken in conjunction with the accompanying drawings, in which:

FIG. 1(*b*) is a side view of the drill looking in the direction of the arrow B in FIG. 1(*a*);

FIG. 1(*c*) is a side view of the drill looking in the direction of the arrow C in FIG. 1(*a*);

FIG. 2(*b*) is a side view of the drill shown in FIG. 2(*a*);

FIG. 3(*b*) is a side view of the drill shown in FIG. 3(*a*);

FIG. 4(*b*) is a side view of the drill shown in FIG. 4(*a*);

FIG. 5(*b*) is a side view of the drill shown in FIG. 5(*a*);

FIG. 6(*a*) is a view showing the manner in which a sheet of glass is drilled by a conventional drill;

FIG. 6(*b*) is a fragmentary enlarged view of the glass encircled in FIG. 6(*a*); and FIG. 7 is a view showing the manner in which a ceramic plate is drilled by a conventional drill.

BEST MODE FOR CARRYING OUT THE INVENTION

Figure 5A:
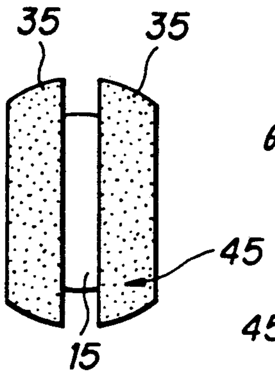
FIG. 5(a) PRIOR ART
FIG. 5(*a*) is a front view of a test drill manufactured in the process of making the present invention.
Figure 5B:
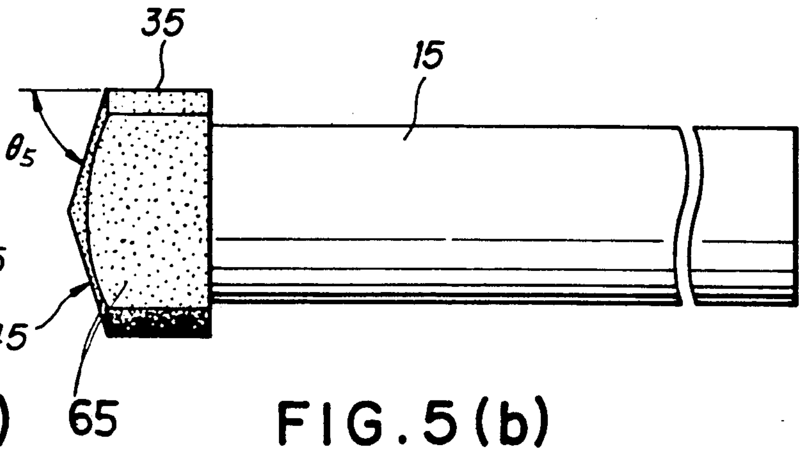
FIG. 5(b) PRIOR ART

The present invention has been made in view of the fact that super abrasive grains are effective in drilling hard and brittle materials. The super abrasive grains may be impregnated by glass, metal or resin. FIG. 5 shows a test tool which includes a shank 15, plate-like primary cutting edges 45 attached to one end of the shank 15, and secondary cutting edges 35 formed integrally with the primary cutting edge 45. In this case, the primary cutting edge 45 include no such chisel edges. The both edges 45 and 35 have each an abrasive grain layer of identical grain concentration, the diameter of an abrasive grain in the primary cutting edge 45 is identical to that of an abrasive grain in the secondary cutting edge 35. Each of the primary and secondary cutting edges has tapered at an angle of 75°. Specifically, in order for the abrasive grains to project from the surface of the drill, the test drill uses a binder made of bronze and the like. This binder is hardly subject to elastic deformation and has high rigidity. Each abrasive grain layer has impregnated diamond grains 65 having a 50 concentration, with the diamond grains having diameters within the range of between 50 to 325 mesh. According to convention, a 100 concentration designates 72 carats of diamond per cubic inch (i.e., 0.0044 carats per cubic millimeter) and smaller concentration numbers refer to the fractional part of 100 concentration in the layer. That is, a 50 concentration designates 36 carats per cubic inch (0.0022 carats per cubic millimeter). Thus, as used herein, "concentration" is measured in weight per unit volume. Each test drill has an effective diameter of 10 mm.

The test drills are rotated at 1,800 rpm and fed at 40 mm/min (10 mm/min for a ceramics workpiece) to drill two different workpieces, one made of glass and the other made of alumina ceramics. Table 1 shows the characteristics of these workpieces. Table 2 shows the test results for the maximum width G of each chip (twenty chips on the average) at the entrance of each hole. It is clear from Table 2 that the smaller the diameter of an abrasive grain, the smaller the width G of a chip. The speed of rotation and feed rate of each drill has little effect on the width of each chip. It has been found that serious chattering occured at the exit of each hole, regardless of grain diameter.

Figure 1:
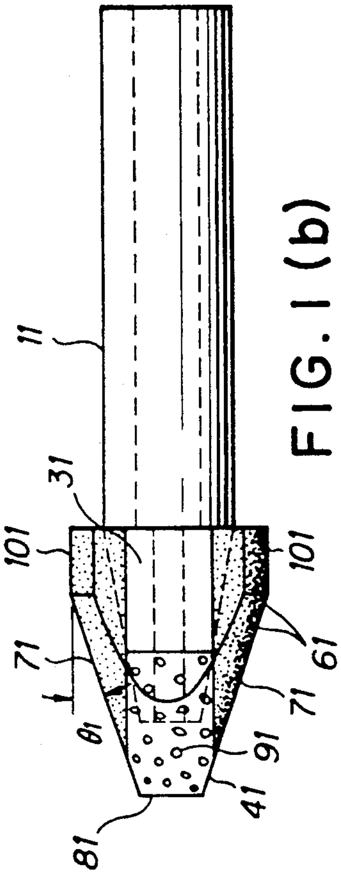
FIG. 1(*a*) is a front view of a drill according to one embodiment of the present invention.
Figure 1:
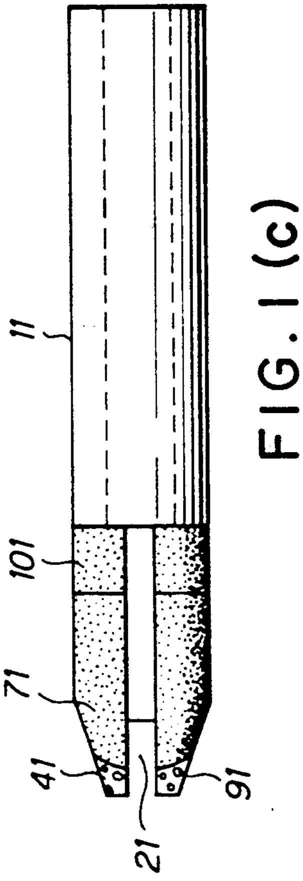

The present invention will now be described, by way of example, with reference to the drawings. FIG. 1(*a*) is a front view of a drill of the present invention. FIG. 1(*b*) is a side view of the drill looking in the direction of the arrow B in FIG. 1(*a*). FIG. 1(*c*) is a side view of the drill looking in the direction of the arrow C of FIG. 1(*a*). The drill is designed to drill relatively large holes and includes a pipe or a shank 11, and a pair of diametrically opposite longitudinally extending primary cutting edges 41, 41 with a gap 21 left therebetween. Each of the primary cutting edges 41, 41 is in the form of a tapered plate and converges toward a tip 81. The tip 81 has two concentric arcuate surfaces. The tip 81 is located adjacent to a center ($O_1$) of rotation of the drill and subject to the maximum load during drilling operation.

Four tapered first secondary cutting surfaces 71 extend from the primary cutting edges 41, 41 and are tapered at an angle of $\theta_1$ relative to a line parallel to the central axis of the drill. This angle of taper is identical to that of each of the primary cutting edges 41, 41. Four second secondary cutting surfaces 101 extend from the four first secondary cutting surfaces 71 and each contains a line parallel to the central axis of the drill. The primary cutting edges 41, 41 and part of the first secondary cutting surfaces 71 are effective to perform a function of drilling and include large diameter diamond grains 91. A portion of the drill as indicated by reference numeral 31 is integral with the primary cutting edges 41, but includes no such diamond grains. The drill has an effective diameter (Do) of 15 mm. In the primary cutting edge 81, there is a first diamond grain layer including diamond grains 91, having a 50 concentration and of a diameter of 100 mesh, and which are bonded by bronze. In the first and secondary cutting surfaces 71 and 101, there is a second diamond grain layer including diamond grains 61, having a 75 concentration, and a diameter of 325 mesh, which are bonded by bronze. Each of the primary cutting edges and first secondary cutting surfaces is tapered at an angle of $\theta$10°. Such tapering is effected by means of an abrasive wheel. The drill is rotated at 2000 rpm with a thrust of 10 kgf (20 kgf ceramic workpiece) to drill the workpieces shown in Table 1. Table 3 shows the results. For the purpose of comparison, there are used a core drill configured as shown in FIG. 7 and a drill configured as shown in FIG. 6. The outer diameter of each of these drills is 15 mm. Commercially available diamond grains are deposited on the both drills and each has a diameter of 100 mesh.

Figure 2:
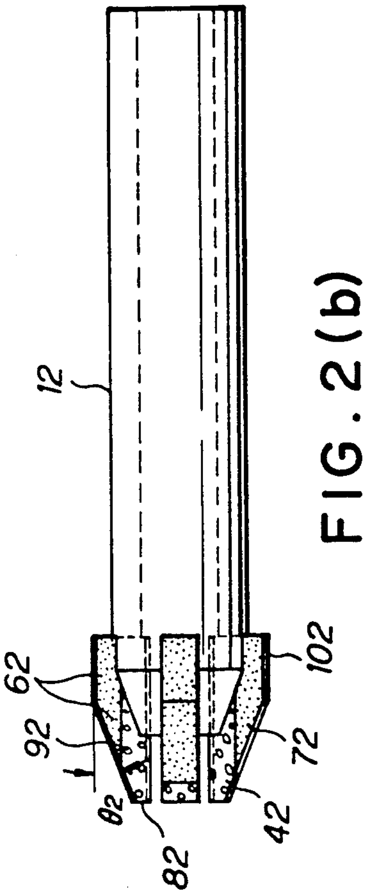
FIG. 2(*a*) is a front view of a drill according to another embodiment of the present invention.
Figure 1:
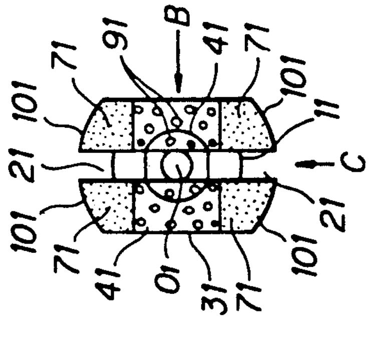
Figure 2:
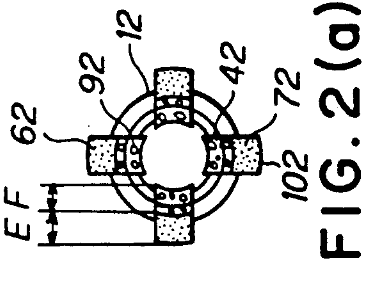

FIG. 2(*a*) shows a core drill according to another embodiment of the present invention. FIG. 2(*b*) is a side view of the core drill. The drill has a shank 12 and four substantially identical cutting edges formed at one or front end of the shank 12 in a circumferentially equally spaced relation. Each of the cutting edges includes a primary cutting edge 42 having diamond grains 92. A first secondary cutting surface 72 and a second secondary cutting surface 102 are sintered together with the primary cutting edge 42, and then all of these cutting edge and surfaces are attached to the cylindrical shank 12 by brazing or by resin. The primary cutting edge 42 and the first secondary cutting surfaces 72 are both finished by means of an abrasive wheel and tapered at an angle ($\theta_2$), relative to a line parallel to the central axis of the drill. The thickness (F) of each primary cutting edge 42 and the thickness (E) of each of the first and second secondary cutting surfaces 72 and 102 may be changed to provide tapered surfaces, and each of the first secondary cutting surfaces may have grains of different diameters so as to provide corrugated surfaces. Each of the second secondary cutting surfaces 102 contains a line parallel to the central axis of the drill. Each of the first secondary cutting surfaces 72 is inclined relative to each of the second secondary cutting surfaces 102 with an angle $\theta_2$. The tool shown in FIG. 2 is a core drill designed to prevent chippage and chattering and adapted for use in drilling relatively large holes. This drill has an effective diameter ($D_o$) of 30 mm. Each primary cutting edge 42 has a layer of diamond grains 92 of 100 mesh. Each of the first and second secondary cutting surfaces 72 and 102 has a layer of diamond grains 62 of 325 mesh. The angle $\theta_2$ is greater than zero and less than 90°. The drill is rotated at 3,000 rpm and fed at 50 mm/min to drill the workpieces made of glass shown in Table 1. Table 4 shows the relationship between maximum width of chatter (2H) and effective diameter ($D_o$). It is to be understood that chattering can be completely avoided by determining the angle $\theta_2$ of taper to be greater than zero and less than 45°, preferably 35°.

Figure 3A:
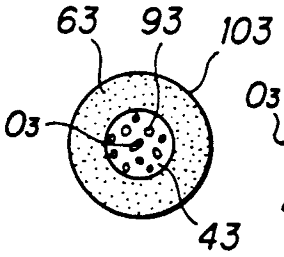
FIG. 3(*a*) is a front view of a drill according to still another embodiment of the present invention.
Figure 3B:
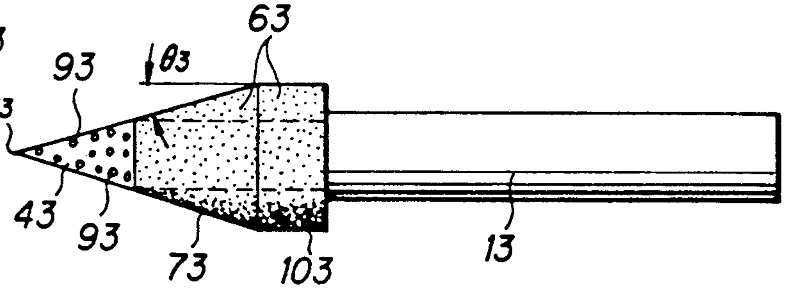
Figure 4A:
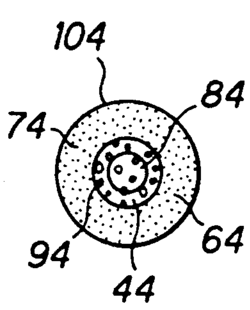
FIG. 4(*a*) is a front view of a drill according to another embodiment of the present invention.
Figure 4B:
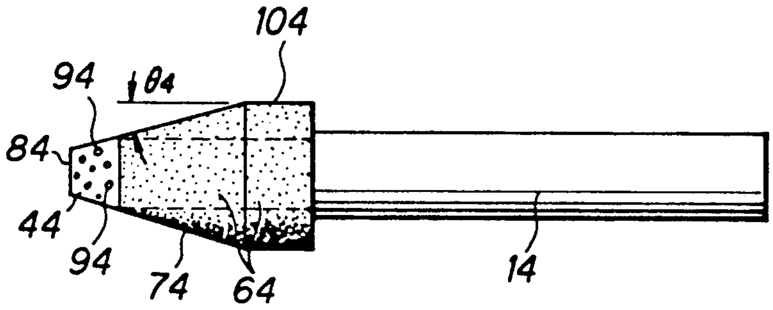

FIGS. 3 and 4 show a drill made according to another embodiment of the present invention and designed to drill relatively small holes. In FIG. 3 the drill includes a primary cutting edge 43 tapered inwardly toward a tip with an angle $\theta_3$. FIGS. 3(*a*) and 3(*b*) are front and side views of the drill, respectively. FIGS. 4(*a*) and 4(*b*) are front and side views of another embodiment of the drill according to the present invention, respectively. The drill in FIGS. **4*a*, 4*b* has a flat tip 84**.

In the illustrated embodiments shown in FIGS. 3 and 4, the drills use synthetic diamond grains 93 and 94, respectively. The diameters of the synthetic diamond grains in each of the primary cutting edges 43 and 44 are of between 30 to 200 mesh. The diameters of super abrasive grains in each of the first secondary cutting surfaces 73 and 74 and the second secondary cutting surfaces 103 and 104 are of between 200 to 325 mesh. Each of the primary cutting edges 43 and 44 has a diamond grain layer with the diamond grains having a 30 to 75 concentration. Each of the first and second secondary cutting surfaces has a diamond grain layer having at least a 75 concentration of diamond grains.

As to a workpiece made of glass, drilling can be effected much faster with the present invention than with conventional drills, that is, by 50% and 90% faster than drills shown in FIGS. 6 and 7, respectively. The quality of a surface roughness RZ of a drilled workpiece surface is improved by 30%.

Care should be taken to use coolant to cool holes during drilling to improve performance of the drill.

Although the description of the preferred embodiments has been quite specific, it is contemplated that various modifications may be made without departing from the spirit of the present invention. Accordingly, the present invention should be dictated by the appended claims rather than by the description of the preferred embodiments.

TABLE 1

| | | |
|---|---|---|
| Alumina ceramics Thickness 5.0 mm | $Al_2O_3$ | 98.0% |
| | Density | 3.96 g/cm$^3$ |
| | Bending strength (3 points) | 400 MPa |
| | Hardness | 1600 Hv |
| | Sintering method | Normal pressure |
| Glass Thickness 5.0 mm | $SiO_2$ | 72% |
| | $Na_2O$ | 14% |
| | CaO | 8% |
| | MgO | 3.5% |
| | $Al_2O_3$ | 2.5% |
| | Bending strength (3 points) | 50 MPa |
| | Hardness | 500 Hv |

TABLE 2

| Diameter of diamond grain mesh | Width G of chip (mm) Glass | Width G of chip (mm) Alumina ceramics |
|---|---|---|
| 50 | 2.1 | 1.8 |
| 80 | 1.2 | 0.7 |
| 100 | 0.9 | 0.2 |
| 140 | 0.4 | 0.15 |
| 200 | 0.3 | 0.09 |
| 325 | 0.09 | 0.03 |

TABLE 3

| | Alumina ceramics | | Glass | |
|---|---|---|---|---|
| | Width of chip G (mm) | 2H/Do (%) | Width of chip G (mm) | 2H/Do (%) |
| Drill of the present invention | 0.01 | 7.0 | 0.02 | 10 |
| Core drill in FIG. 7 | 3.0 | 55.0 | 14.0 | 210 |
| Twist drill in FIG. 6 | 2.0 | 78.0 | 9.0 | 350 |

TABLE 4

| Angle of taper ($\theta_2$) (Degree) | Maximum width of chatter (2H)/ Effective diameter (Do) × 100% |
|---|---|
| 0 | 250 |
| 3 | 19 |
| 5 | 13 |
| 10 | 9 |
| 15 | 22 |
| 30 | 55 |
| 35 | 80 |
| 45 | 100 |
| 60 | 140 |
| 75 | 170 |
| 80 | 190 |
| 90 | 250 |

What is claimed is:

1. A drill for use in drilling hard and brittle materials, comprising:

a shank adapted for attachment to a shaft of a machine; and a drilling portion attached to one end of said shank and including a tapered primary cutting edge located adjacent to a center of rotation of the drill, a first secondary cutting surface extending from said primary cutting edge and having an angle of taper substantially identical to that of said primary cutting edge, and a second secondary cutting surface extending from said first secondary cutting surface and containing a line substantially parallel to a central axis of the drill;

said primary cutting edge having a first abrasive grain layer, and said first and second secondary cutting surfaces both having a second abrasive grain layer, said first and second abrasive grain layers both having a binder made of a material selected from the group consisting of metal, resin and glass, and each abrasive grain in the first abrasive grain layer located on said primary cutting edge having a diameter greater than that of each abrasive grain in the second abrasive grain layer located on each of said first and secondary cutting surfaces.

2. A drill according to claim 1, wherein said first abrasive grain layer located on said primary cutting edge has a grain concentration in weight per unit volume less than that of said second abrasive grain layer located on each of said first and second secondary cutting surfaces.

3. A drill according to claim 2, wherein said angle of taper of said first secondary cutting surface, relative to a line parallel to the central axis of the drill, is greater than zero and less than 45 degrees.

* * * * *